(12) United States Patent
Woo et al.

(10) Patent No.: US 11,145,103 B2
(45) Date of Patent: *Oct. 12, 2021

(54) SYSTEM AND METHOD FOR GENERATING ANIMATED EMOJI MASHUPS

(71) Applicant: PAYPAL, INC., San Jose, CA (US)

(72) Inventors: Titus Woo, San Jose, CA (US); Wei Ting Kuo, San Jose, CA (US); Xueguang Lu, San Jose, CA (US); Venkatesh Komma, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/855,976

(22) Filed: Dec. 27, 2017

(65) Prior Publication Data
US 2019/0122412 A1      Apr. 25, 2019

Related U.S. Application Data

(63) Continuation-in-part of application No. 15/790,799, filed on Oct. 23, 2017, now Pat. No. 10,593,087.

(51) Int. Cl.
*G06T 13/80* (2011.01)
*G06T 11/60* (2006.01)
(Continued)

(52) U.S. Cl.
CPC ............ *G06T 13/80* (2013.01); *G06F 40/274* (2020.01); *G06F 40/279* (2020.01); *G06F 40/30* (2020.01);
(Continued)

(58) Field of Classification Search
CPC ....... H04L 51/04; H04L 51/043; H04L 51/10; G06F 17/21; G06F 17/2205; G06F 17/2217; G06F 17/24; G06F 17/241; G06F 17/2765; G06F 17/277; G06F 17/278; G06F 17/2809; G06F 17/2827; G06F 17/2836; G06F 17/289; G06F 16/14; G06F 40/274; G06F 40/279; G06F 40/30; G06F 40/40;
(Continued)

(56) References Cited

U.S. PATENT DOCUMENTS 9,794,202 B1 *   10/2017   Pereira ................. H04L 51/046
2005/0156873 A1    7/2005   Walter et al.
(Continued)

FOREIGN PATENT DOCUMENTS

EP        1771002         4/2007

OTHER PUBLICATIONS

"How to Convert Text to Emoji in Messages on iPhone", Jan. 6, 2017—12 Comments, OSXDaily, pp. 9 (Year: 2017).*
(Continued)

*Primary Examiner* — Chau T Nguyen
(74) *Attorney, Agent, or Firm* — Haynes and Boone, LLP

(57) ABSTRACT

Aspects of the present disclosure involve systems, methods, devices, and the like for animated emoji mashup generation. The system and method introduce a method and model that can generate animated emoji mashups representative of contextual information received by a user at an application. The animated emoji mashup may come in the form of emojis coherently combined with one or more images to represent the contextual idea or emotion being conveyed.

20 Claims, 9 Drawing Sheets

(51) Int. Cl.
*G06T 13/40* (2011.01)
*G06F 40/30* (2020.01)
*G06F 40/40* (2020.01)
*G06F 40/274* (2020.01)
*G06F 40/279* (2020.01)

(52) U.S. Cl.
CPC .............. *G06F 40/40* (2020.01); *G06T 11/60* (2013.01); *G06T 13/40* (2013.01)

(58) Field of Classification Search
CPC ...... G06F 40/58; G06F 40/151; G06F 40/157; G06F 2207/025; G06F 2209/462; G06F 40/47; G06F 40/49; G06F 40/56; G06F 40/247; G06F 40/242; G06F 40/45; G06T 11/60; G06T 13/40; G06T 13/80
See application file for complete search history.

(56) References Cited

U.S. PATENT DOCUMENTS

| | | | |
|---|---|---|---|
| 2012/0059787 A1 | 3/2012 | Brown et al. | |
| 2015/0277686 A1* | 10/2015 | LaForge | H04L 67/10 715/723 |
| 2016/0110906 A1 | 4/2016 | Ahuja et al. | |
| 2016/0191958 A1 | 6/2016 | Nauseef et al. | |
| 2016/0291822 A1* | 10/2016 | Ahuja | H04L 51/32 |
| 2017/0018289 A1* | 1/2017 | Morgenstern | G11B 27/036 |
| 2017/0052946 A1* | 2/2017 | Gu | H04L 51/046 |
| 2017/0075878 A1* | 3/2017 | Jon | G06F 40/274 |
| 2017/0118189 A1* | 4/2017 | Venkatakrishnan | H04L 63/08 |
| 2017/0124713 A1* | 5/2017 | Jurgenson | G06T 19/006 |
| 2017/0140214 A1 | 5/2017 | Matas et al. | |
| 2017/0154055 A1* | 6/2017 | Dimson | G06F 16/5838 |
| 2017/0185580 A1* | 6/2017 | Zhang | G06F 3/04842 |
| 2017/0185581 A1* | 6/2017 | Bojja | G06F 40/242 |
| 2017/0189641 A1* | 7/2017 | Moturu | G06F 19/3418 |
| 2017/0300462 A1* | 10/2017 | Cudworth | G06F 3/0237 |
| 2017/0344224 A1* | 11/2017 | Kay | G06F 40/205 |
| 2018/0024726 A1* | 1/2018 | Hviding | G06F 3/04845 715/204 |
| 2018/0024991 A1* | 1/2018 | Baldwin | G06F 17/2785 704/9 |
| 2018/0083898 A1* | 3/2018 | Pham | G06F 40/274 |
| 2018/0137529 A1* | 5/2018 | Griffin | G06Q 50/01 |
| 2018/0227256 A1* | 8/2018 | Wilson | H04L 51/10 |
| 2018/0260385 A1* | 9/2018 | Fan | G06F 40/30 |
| 2018/0314409 A1* | 11/2018 | Adilipour | G06F 16/54 |
| 2018/0356957 A1* | 12/2018 | Desjardins | G06F 40/279 |
| 2019/0096113 A1* | 3/2019 | Stukalov | G06T 11/60 |

OTHER PUBLICATIONS

Karrar Haider in Mobile, "10 Tools to Create Custom Emoji", Nov. 26, 2017, pp. 10 (Year: 2017).*

"Programming Snapchat-Like Filters", Nov. 28, 2017, pp. 55 (Year: 2017).*

Olanoff, Drew, "What in the hell is a #TacoEmojiEngine? TechCrunch", Nov. 12, 2015, Retrieved from the Internet: <URL:https://web.archive.org/web/2015111220 1001/https://techcrunch.com/2015/11/1 Q/what-in-the-hell-is-a-tacoemojiengine/>.

Extended European Search Report dated Jun. 18, 2021, European Patent Application 18870855.6, 9 pages.

* cited by examiner

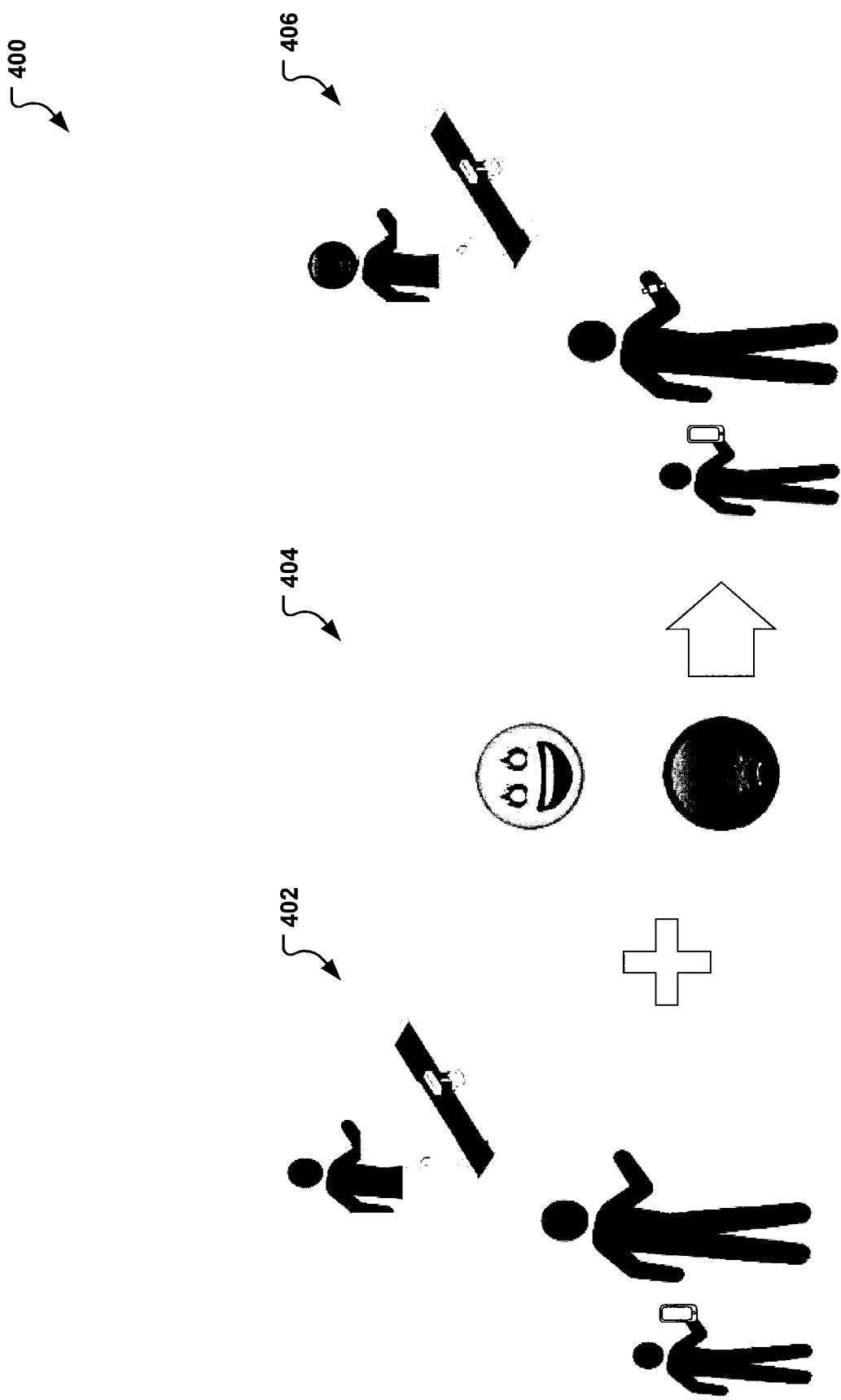

SYSTEM AND METHOD FOR GENERATING ANIMATED EMOJI MASHUPS

CROSS REFERENCE TO RELATED APPLICATION

This application is a continuation in part of U.S. patent application Ser. No. 15/790,799, filed on Oct. 23, 2017, which is hereby incorporated by reference in its entirety for all purposes.

TECHNICAL FIELD

The present disclosure generally relates to user device communication, and more specifically, to user device communication using animated emojis.

BACKGROUND

Nowadays with the evolution and proliferation of devices, users are constantly connected to the internet and social media as a means for communication. Oftentimes, in the communication the users resort to the use of emojis to express an emotion, an idea, place, event, etc. The emojis are often available for selection from the application in use and may be selected by the user. In some instances however, the emoji may appear in response to the word or group of words typed by the user. These emojis are often restricted to the emojis available to the application and/or constraint by the one or more words identified by the application that relate to an emoji. This however, may lead to an incorrect emoji being presented, as the emoji may not fit the occasion. In other words, the emojis presented are constrained to the one or more words matched to the emoji. Thus, the sentiment or occasion as described by a sentence typed is not understood and the user instead resorts to a sticker or gif for the emotion. Therefore, it would be beneficial to create a system that can generate emojis and/or a juxtaposition of an emoji with other digital data that is tailored for the conversation.

BRIEF DESCRIPTION OF THE FIGURES

FIG. 4 illustrates a graphical diagram demonstrating exemplary animated emoji mashup.

Figure 1:
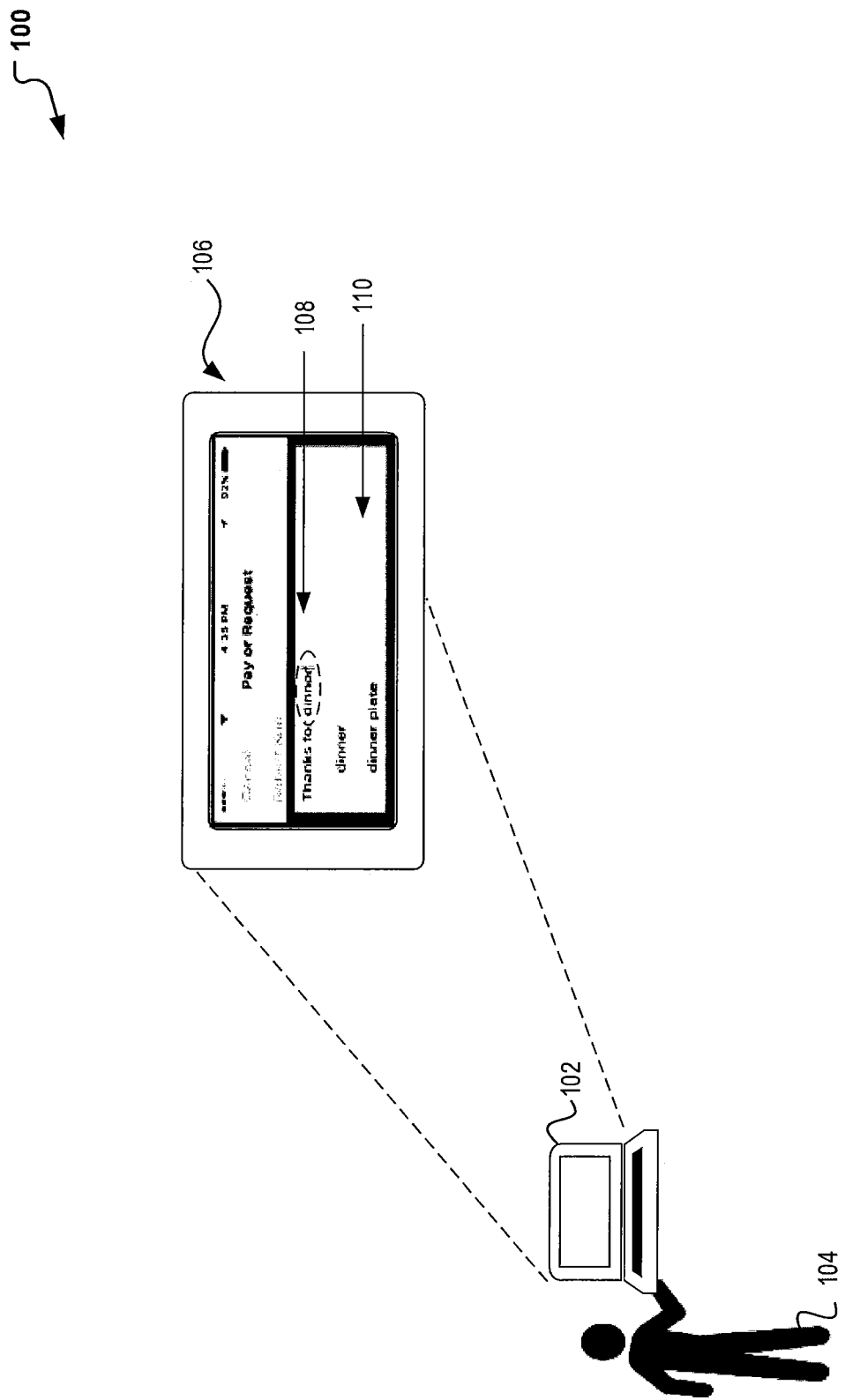
FIG. 1 illustrates a graphical diagram of a user communicating with a user device.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for animated emoji mashup generation. The system and method introduce a method and model that can generate animated emoji mashups representative of contextual information received by a user at an application. The animated emoji mashup may come in the form of emojis coherently combined with one or more images to represent the contextual idea or emotion being conveyed.

Conventionally, device users have depended on pre-defined emojis for use in expressing emotions, ideas, or places. However, oftentimes, the user may be limited to those emojis available on the application. In some instances, the emoji available is further limited and presented in response to the recognition of one or more words being input/typed by the user. The emojis presented however, may be out of context or don't fully express the sentiment of the conversation.

An example, FIG. 1 illustrates a graphical diagram 100 of a user 104 communicating with a user device 102. In particular, FIG. 1 illustrates a user 104 interacting with an application 106 on a user device 102. The user device 102 may include a smart phone, tablet, computer, laptop, wearable device, tablet, virtual reality system, etc. The user device 102 may be capable of communicating with one or more devices over one or more networks. In some instances, the user device 102 may include the interaction with an application for communicating over social media, communicating with another individual, transferring funds, processing transactions or the like. As illustrated, the user 104 may be interacting with the application (e.g., Venmo) over user device 102. The application (e.g., Venmo) 106 may include one that presents emojis in response to detecting a word(s) (e.g., dinner) that is correlated with the words detected. As an example, FIG. 1 illustrates user 104 interacting with Venmo with the indication that a payment will be made to a person (e.g., Robert Kuo) in response to a dinner outing. In the message, the user is thanking Robert for dinner and in response to the detection of the word dinner 108, emojis 110 that have been identified to correlate with the word dinner 108 appear. In the example, the application recognizes the word dinner 108 and in response silverware and dinner plate emojis 110 are presented. A disadvantage however, as illustrated, is that word-to-emoji type matching is limited by the correlations that the system has and corresponding emojis 110 available for selection.

In one embodiment, a system and method is introduced that enables animated emoji mashups with machine learning. That is to say, a system and method are introduced that enable the ability to combine an emoji and another related digital media to generate at least a single animated emoji that represents more than a single word or words, but instead a sentence and/or the context involved in a communication.

Figure 2:
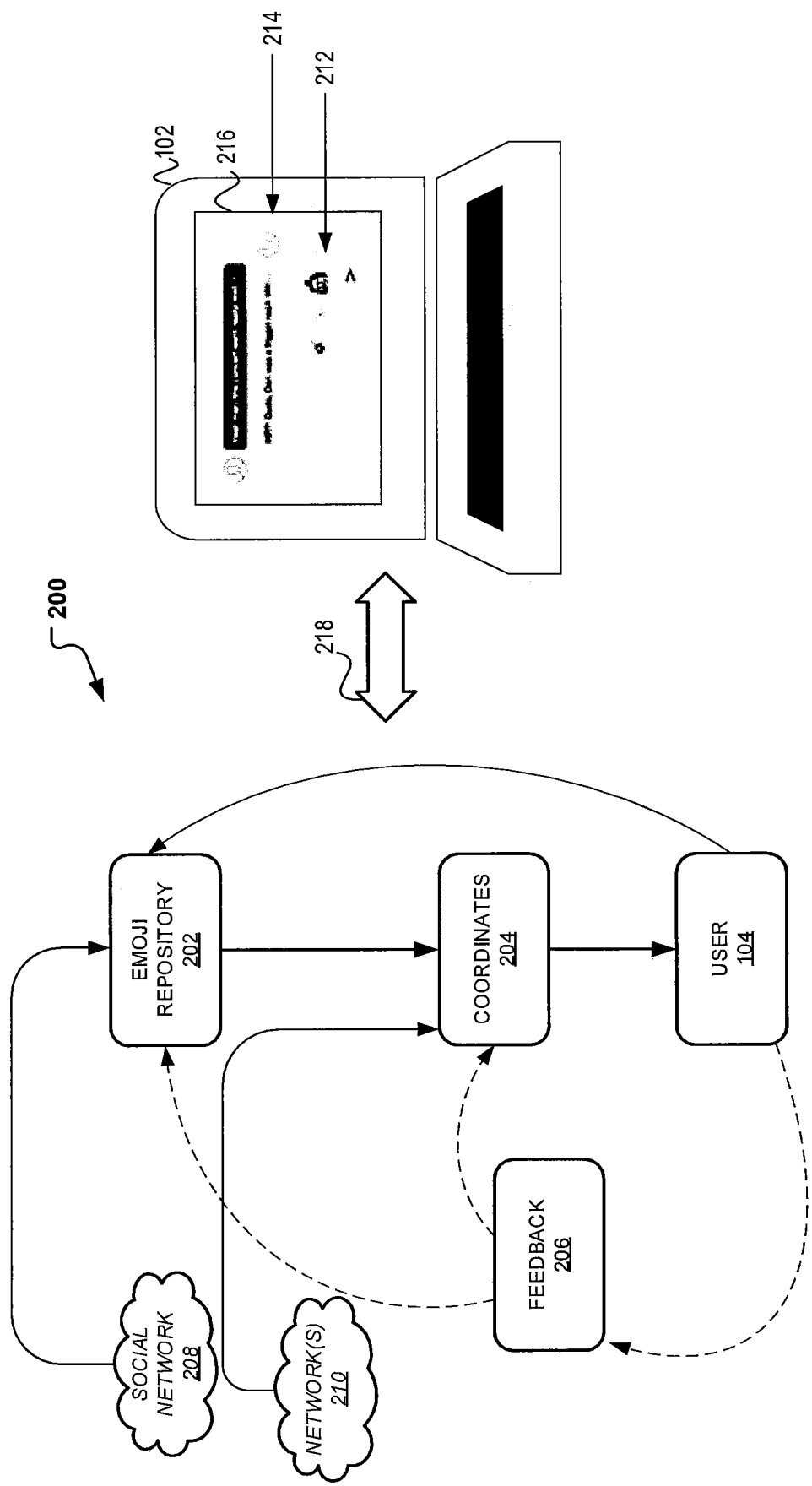
FIG. 2 illustrates a graphical diagram of user device communication using emoji mashup.

FIG. 2 illustrates a graphical diagram of user device communication using animated emoji mashup. In particular FIG. 2 illustrates a flow diagram 200 for generating animated emoji mashups that may then be presented on a user interface of an application 106 on a user device 102.

As indicated above, a large limitation exists in current emojis used, based in part, on the partial library that may be available on the application as well as the strict emoji-word designation based on predefined correlations. Flow diagram 200 is presented as an exemplary communication that can occur between various systems that can enable the generation of animated emoji mashups that are more closely related to the contextual information on the message at the time.

For example, as illustrated in flow diagram 200, an emoji repository/system 202 that may be in communication with external networks 210 including social networks 208 (e.g., Twitter, Facebook) may be used. These networks can communicate and share emojis available that may be used by the user device 102 during an interaction with another user (e.g., a Venmo transaction). The flow diagram also illustrates a coordinate system 204 that may be in communication with at least the user device 102 and external networks 210. The coordinate system 204 can be a system that uses the emoji details gathered from the user device 102, social networks 208, and other external networks 210 to determine how to best locate the two or more emojis or other media that may be use for that becomes the animated emoji mashup 212 and/or to extract coordinate information from two or more emojis or other media data to determine how to best place the emojis with respect to each other in response to the contextual information gathered during the user device interaction with the another user.

The coordination, repository and use of intelligent algorithms work jointly to generate the new emoji mashup. Feedback from user input is also used to learn and identify the best matches as well as identify new emoji mashups 212. Note that the animated emoji mashups may be generated from a combination of one or more emojis and/or other media data. The media data can include images, gifs, stickers, videos, and the like that may be juxtaposed with the one or more emojis to convey the context of the conversation or communication between devices.

To illustrate the idea of emoji mashup 212, FIG. 2 includes a conversation on a display 216 on user device 102. As an example, on the display 216, user 104 is communicating with another user regarding a concert that was attended. The other user comments on the concert and how well it went while user 104 responds with, "IKR?! Dude, Dan was a friggin rock star . . . ." In response the user's comments 214, emoji mashups 214 are presented which are suggested in response to the context in the conversation.

Notice that unlike conventional systems where the word "rock" or "star" would be recognized and a rock or star would be suggested, here instead more relevant emoji mashups 214 are suggested. For example, a guitar and a star are combined, a rock&roll emoji and stars are combined, and an image of Dan as a rockstar is illustrated. Thus, the emoji mashup 214 presents an emoji that represents the idea and/or emotion in a more comprehensive manner.

Figure 3:
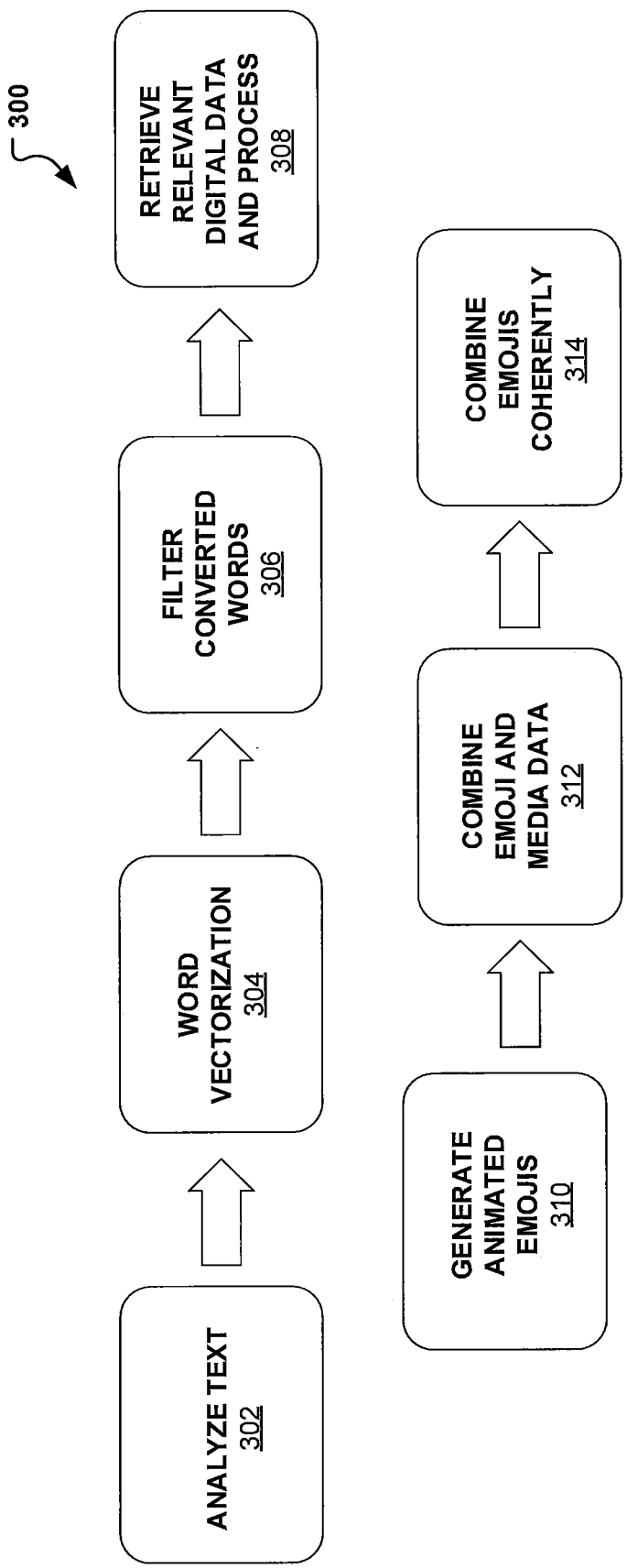
FIG. 3 illustrates a block diagram of a system for the overall process for generating emoji mashups with machine learning.

Turning to FIG. 3, a more detailed description of the overall process for generating the animated emoji mashup 214 is presented. In particular, FIG. 3 illustrates a block diagram of a methodology 300 for generating animated emoji mashups. Methodology 300 presents the model that may be used for retrieving, analyzing, and training information received for suggesting animated emoji mashups 212. Methodology 300 can begin with first analyzing the text 302 received by the application. As indicated above, an aspect of the current embodiment includes retrieving mashup emojis 212 that closely correlate with the contextual information received. Analyzing the text can include taking the message transmitted and evaluating the contextual information to identify the words transmitted. In addition, the information can also be run through a system and method of evaluating the context which includes word vectorization 304. Word vectorization 304 is a method that uses computational intelligence including neural networks and natural language processing for generating dictionaries from words into real-valued vectors. The process which includes converting a bitmap image into a vector representation such that terms are given a corresponding number such that the closer the words are in relationship to each other the closer the numerical number between the words. As an example, the words can be vectorized to find similar meanings using language models to extract word functions and structure. In addition to vectorization, the information may be sent through a sentiment analyzer where clues about the message tone, purpose, and context may be used in the analysis.

After the words are vectorized, the words can be filtered 306. The filtered vectors may be converted into matrices which can be used to programmatically generate new emojis 308. The new emojis generated can be emojis identified from social networks, system repositories, other networks, etc. In addition to the identification of the text that can be mapped to or represented by one or more emojis, the sentiment and content of text communication can also be represented with the use of gifs, stickers, videos etc. Additionally, videos or other digital data within the text communication can be recognized and updated with emojis to help convey the emotion and context presented in the text. Therefore, relevant media is retrieved 308 for use in the conjunction with the emojis identified and/or for the insertion of emojis identified to the digital data.

Once the new emojis and media are identified and retrieved, the data is combined. Combining the emojis and digital data can occur by using matchmaking logic 310. The matchmaking logic can include coordinates, image recognition systems, as well as machine learning algorithm which can be used to learn and/or determine how to combine the data coherently 312. For example, coordinates from each set of emojis and other data retrieved or generated 308 can be analyzed to determine the corresponding centers and use the data to determine how to best combine. Once one or more emojis and other data are combined to generate animated emoji mashups 212, the emojis can be presented to the user 104 for selection and updated based on user selection so that the most coherent combination 314 is stored for future use.

To illustrate methodology 300, consider a user 104 whose input includes "Dude, you're on fire!" For such input, methodology 300 can use word vectorization and sentiment analysis to determine that the communication includes a positive sentiment and smiley face and flame emoji can be retrieved. In addition, an image of the "Dude" corresponding to the person being communicated with, may be retrieved. Alternatively, a sticker, picture, or other digital media may be retrieved that can be combined with the emojis identified to create the animate emoji mashup. Once these two emojis and/or data are retrieved, the matchmaking algorithm can be used to determine how to scale and place the emojis relative to each other. In one embodiment, the face emoji may be placed prominently in front of the flame emoji which can sit behind on by the head portion of the face. Additionally, a refresh button may be available which can be used to generate a new animated emoji mashup. Thus, with the use of the external networks, user feedback, and system user base (e.g., Paypal/Venmo userbase), machine learning and neural networks may be used to generate new and improved emoji mashups 212 over time.

A large part of the determination on how to merge the digital data and/or emojis is through the use of matchmaking logic. In one embodiment, to determine how to merge the emojis, object recognition is used to determine what the image (or gif, sticker, frame(s), etc.) is and an optimal location to merge. For example, if the two emojis identified include a smiley face and fire in response to "Dude you are on fire!" understanding how to merge the smiley face and the fire is determined using object recognition. To accomplish this, in one embodiment, the system can perform a center of mass like analysis to determine where the center of the object is. In another embodiment, the system can recognize the object (e.g., smiley face and fire images) and extract their coordinates. The object may be detected using an object detection model. In one example, the dimensions may be pulled from the object while in other examples, the images may be turn a determined amount such that depth is provided to the image and coordinates can be extracted. Still in another example, the object detection model may determine the type of digital media retrieved (e.g., sticker, video) and determined based on the data retrieved, how to best combined using various mapping mechanisms and/or using coordinate information. The coordinates can then be provided to the matchmaking logic which can in-turn suggest various ways to merge the data detected (e.g., smiley face and fire emojis).

FIG. 4 illustrates a graphical diagram 400 demonstrating exemplary animated emoji mashup. FIG. 4 illustrates a scene from a video captured and exchanged during a text communication. In this exemplary example, the scene 402 includes customers approaching a register for checkout out and completing a transaction. In this example, the conversation in the text message may have been centered around the check-out process and an encounter with the cashier at the register. In particular, the text may have picked up that the cashier was not the friendliest and "was being a hot head." Referring to middle emojis 404, note that the animated emoji mashup system identifies two possible emojis that may be placed to express the cashier's mood. Notice that the emojis can be an angry emoji and/or a previous emoji mashup that includes a smiley face with fire in their eyes illustrated the "hot head". Notice that the fire emoji and smiley face emoji may have previously presented and stored to represent a hot head, this emoji generated in response to high data points that may have been determined from the initial training by the machine learning system. Also notice that in this instance, the resulting scene 406 on the right includes the original scene identified from a video, picture, or other media exchange (or retrieved) during the text communication and at least one of the emojis identified. The resulting scene uses the object detection model to determine where to place the emoji as well as other learned algorithms for identifying the location of the emoji and the most adequate scene based on the text communication.

Note that in some instances, as illustrated, the final emoji maybe a product of the combination of the two or more emojis suggested by the learning system while in other instances, the emojis may be a newly generated emoji defined by the two or more emojis initially identified. The newly generated emoji may be a merger of the two or a previously defined emoji located internally or on an external network. Also note that the emojis may have been obtained from an external library, repository, database or the like.

Figure 5A:
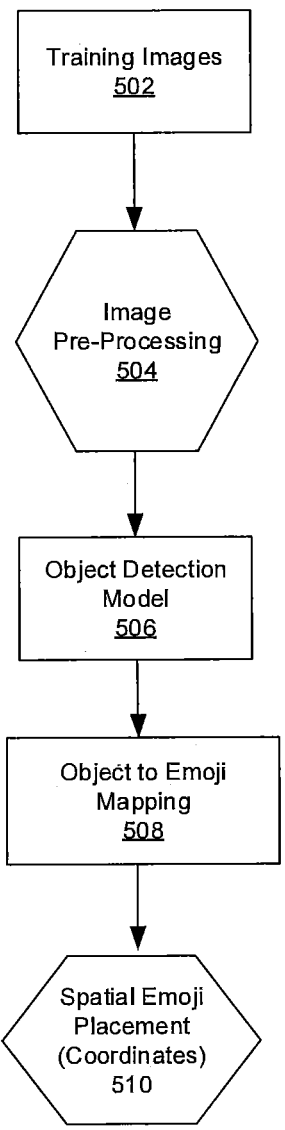
FIGS. 5A-5B illustrate graphical diagrams of training processes for generating animated emoji mashups.
Figure 5B:
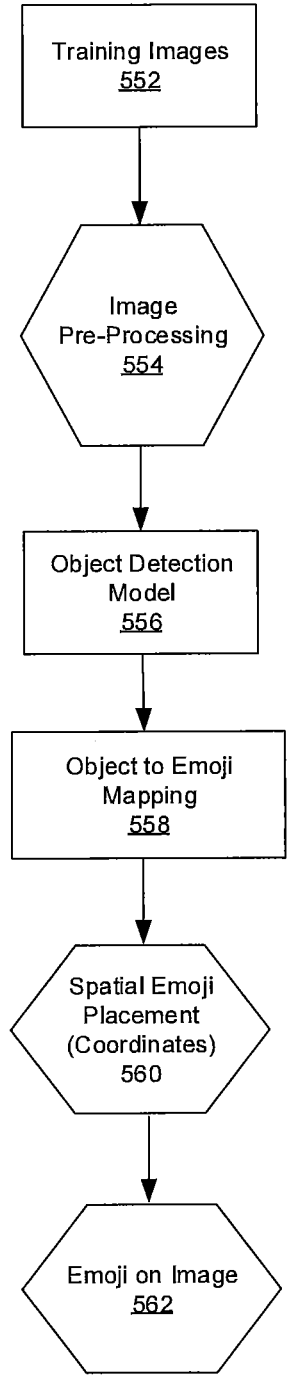
Figure 6:
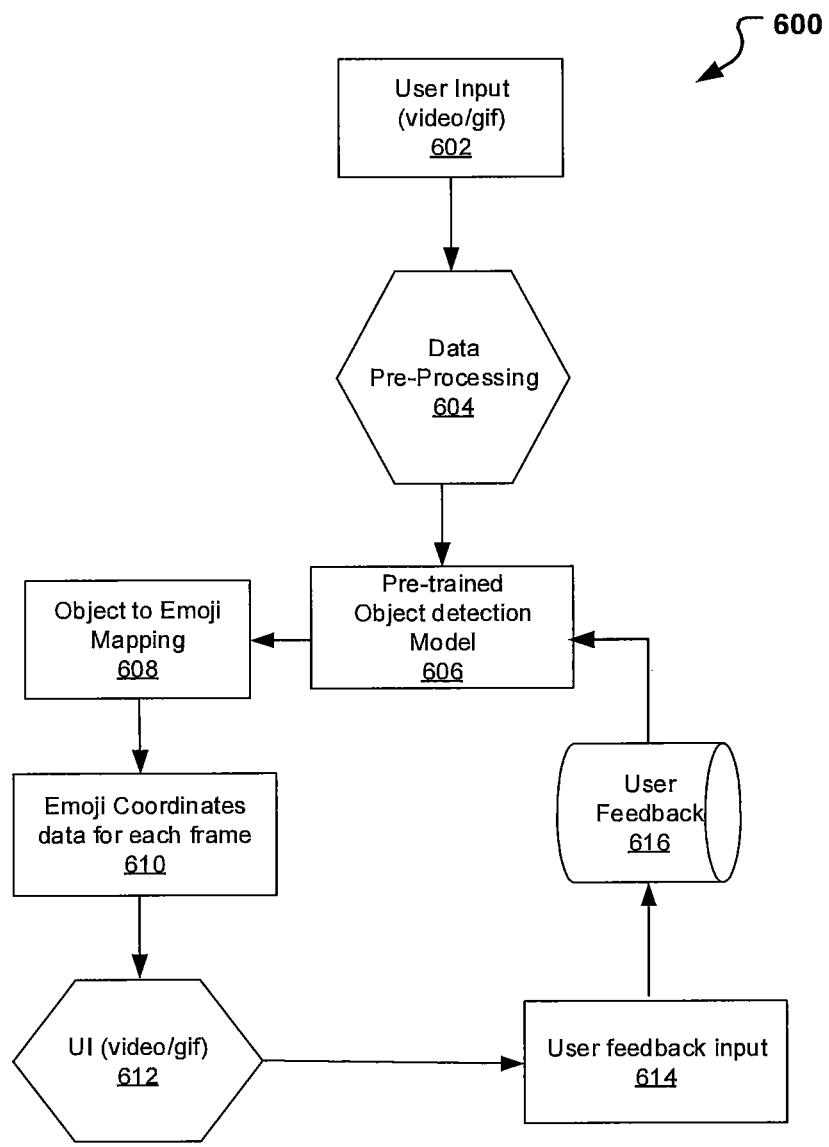
FIG. 6 illustrate a graphical diagram of the runtime process for generating animated emoji mashups.

FIGS. 5A-6 provide illustrate graphical diagrams of training and run-time processes for generating the animated emoji mashups. FIGS. 5A-5B illustrate early processes in the animated emoji mashup generation, where the system may include minimal or no user feedback data that can help train and tailor the emojis and digital data. FIG. 6 illustrates a more mature process where the system is not only using external information (e.g., Twitter® feeds, Google libraries, etc.), but also using internal user feedback during run-time to present the user 104 with the animated emoji mashup suggestions.

FIGS. 5A-5B begin a process for system training with FIG. 5A illustrating the sequences involved in image to emoji placement, while FIG. 5B illustrates an emoji to image placement. Turning to FIG. 5A, the training process 500 begins with training the images (e.g., in the form of a photo, video, gift, and the like) that have been identified. In one embodiment, the images may be retrieved from social media feed's (e.g., Twitter feeds, Facebook® posts, etc.). In another embodiment, the image may be obtained locally, via an exchanged during the text communication and/or obtained from a photo gallery. Image pre-processing 504 can include determining which images are relevant (if a video which frame) and adequately labeling to correspond to content during a communication. In addition to labeling the images, the images are also resized to fit the device in use and user interface.

In another embodiment, instead of or in addition to media training 502 and image pre-processing 504 of digital media, the media training 502 and image pre-processing can occur for the corresponding emojis retrieved. Such that the next sequence includes an object detection model 506 where the digital media is detected based on the context of the text communication between the first and second users 104. As previously indicated, to generate the animated emoji mashup, another emoji, video clip, gifs, stickers, pictures or the like may be used in conjunction with emojis identified through a coherent combining. The object detection model may also use a combination of algorithms and text detection modules to determine the best object fit. Once both the emoji and sequence are identified to generate the animated emoji mashup, object to emoji mapping 508 occurs next. This portion of the mapping includes the determination of how an image will be coherently added to an emoji with coordinate mapping and spatial emoji placement 510 occurring next.

Turning to FIG. 5B, graphical diagrams are illustrated of the training process for generating an animated emoji mashup using an overlay of an emoji on image. Note that the process is very similar to FIG. 5A. Again, in training the system for generating an animated emoji mashup, a fist component in the process includes training images used in the mashup. The images to be trained may be retrieved from social media feeds, external postings, local user device 102 photo gallery, or the like. For example, if the text communication includes a discussion about a concert attended, then the animated emoji systems can retrieve a video from a YouTube® posting on which the emoji will be overlay. Once the correct image used is determined, then mapping the image to the context and a sentiment conveyed by occur. This process may be similar to a word2vec training algorithm where waited values map a word to an emoji or in this case an image. After training, again the images may be labeled and sized appropriately for the interface in use.

The object detection model 556 is then used, where the digital media is detected based on the context of the text communication between the first and second users 104. As previously indicated, to generate the animated emoji mashup, another emoji, video clip, gifs, stickers, pictures or the like may be used in conjunction with emojis identified through a coherent combining. The object detection model may also use a combination of algorithms and text detection modules to determine the best object fit. In the instance where a video is identified, a corresponding frame that fits the conversation may be selected and used in conjunction with the emoji, as illustrated in FIG. 4. Once both the emoji and sequence are identified to generate the animated emoji mashup, object to emoji mapping 558 occurs next. This portion of the mapping includes the determination of how the emoji will be coherently added on an image with coordinate mapping and spatial emoji placement 510 occurring next. The overlay of the emoji on the image 562 finalizes the animated emoji mashup. This training process can continue in order to train the images and/or emojis for use at runtime and to develop a more mature system.

To illustrate how the process operates at run time, FIG. 6 is included. At FIG. 6, the runtime process 600 is presented. As illustrated in runtime process 600, begins with the receipt of user input 602. User input 602 can come in the form of a phrase, a sentence, an abbreviation, text, or the like. In a current embodiment, the user income can be a video and/or a gif. The user input will be received at the display of a user device 102 while on an application 216 in communication with one or more other users.

In runtime process 650, like text training process 500 and 550, the images are processes and mapped to the text on the text communication. Alternatively, the text may be processes and converted using word2vec or other similar algorithm applicable to images, gifs, videos, or other digital data. Next, the information is run against the pre-trained object detection model 606 which can then output the images that correlate to the input text from the user 104. Additionally or alternatively, the images obtained are received 602, processed 604, and run against the pre-trained object detection model 606. After the pre-trained object detection model 606, object to emoji mapping 608 can take place, before the emoji coordinates are evaluated 610 for each frame. Once coordinate data has been evaluated and used to coherently combine the image and emoji to generate an animated emoji mashup, the animated emoji mashup may be sent to the user UI 612 for user selection. Note that in some instances, the two or more mashups may be presented to the user 104, while in other instances, multiple animated emoji mashups may have had already been generated based on the coordinates 642 extracted and presented to the user for user selection 612. After the user 104 has made a selection 614 as to a preferred image to emoji or emoji to image arrangement, emoji/image pair, emoji overlay and/or emoji mashup user feedback is stored 616. As more user preferences and selections are acquired by the system, then user feedback may be used to generate the next animated emoji mashup.

Note that the process presented is for exemplary purposes and other processes, modeling, and training may be contemplated. In addition, a previously indicated, the system is not restricted to the use of an object detection model as other machine learning models may be used.

Figure 7:
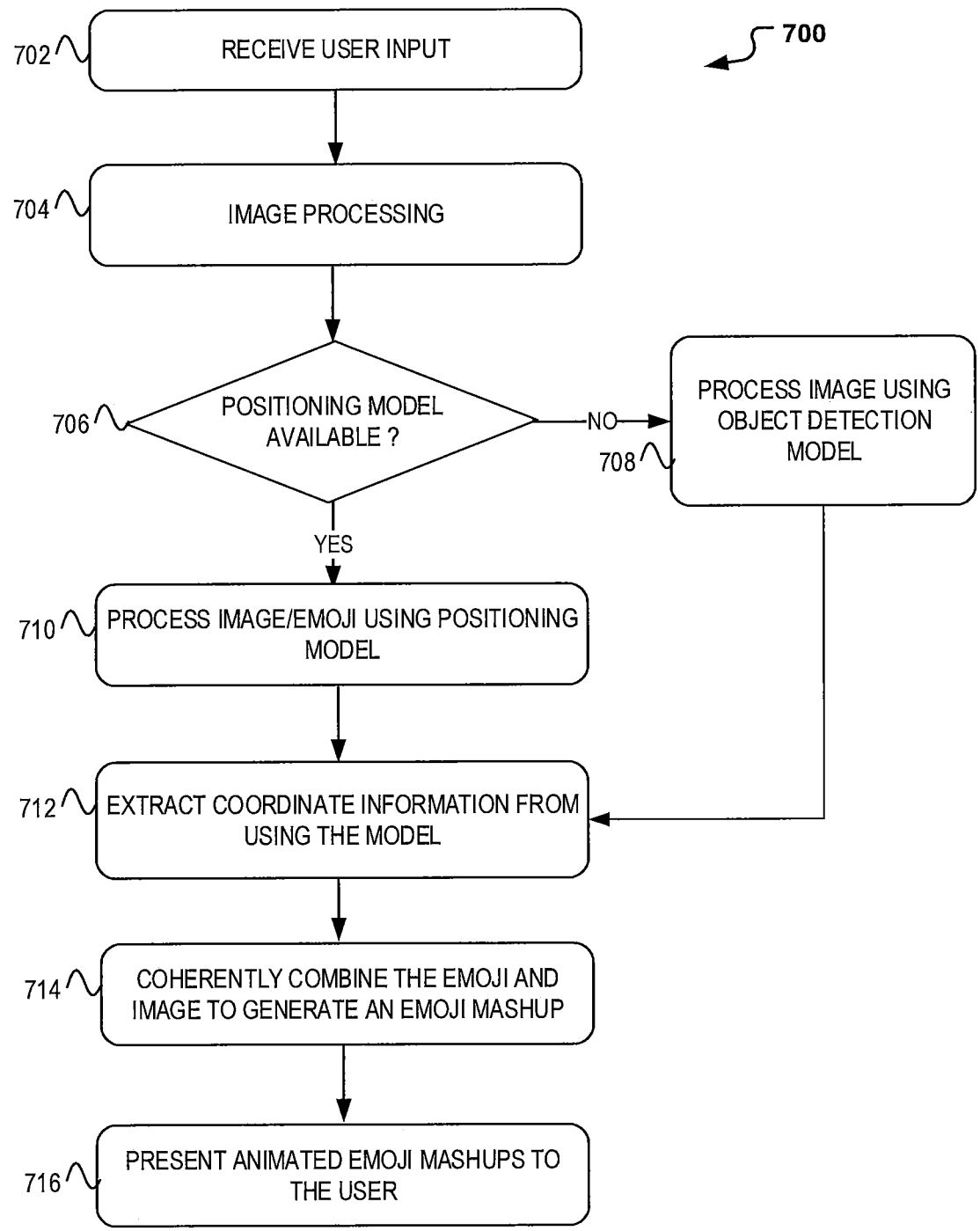
FIG. 7 illustrates a flow diagram illustrating operations for generating emoji mashups.
Figure 8:
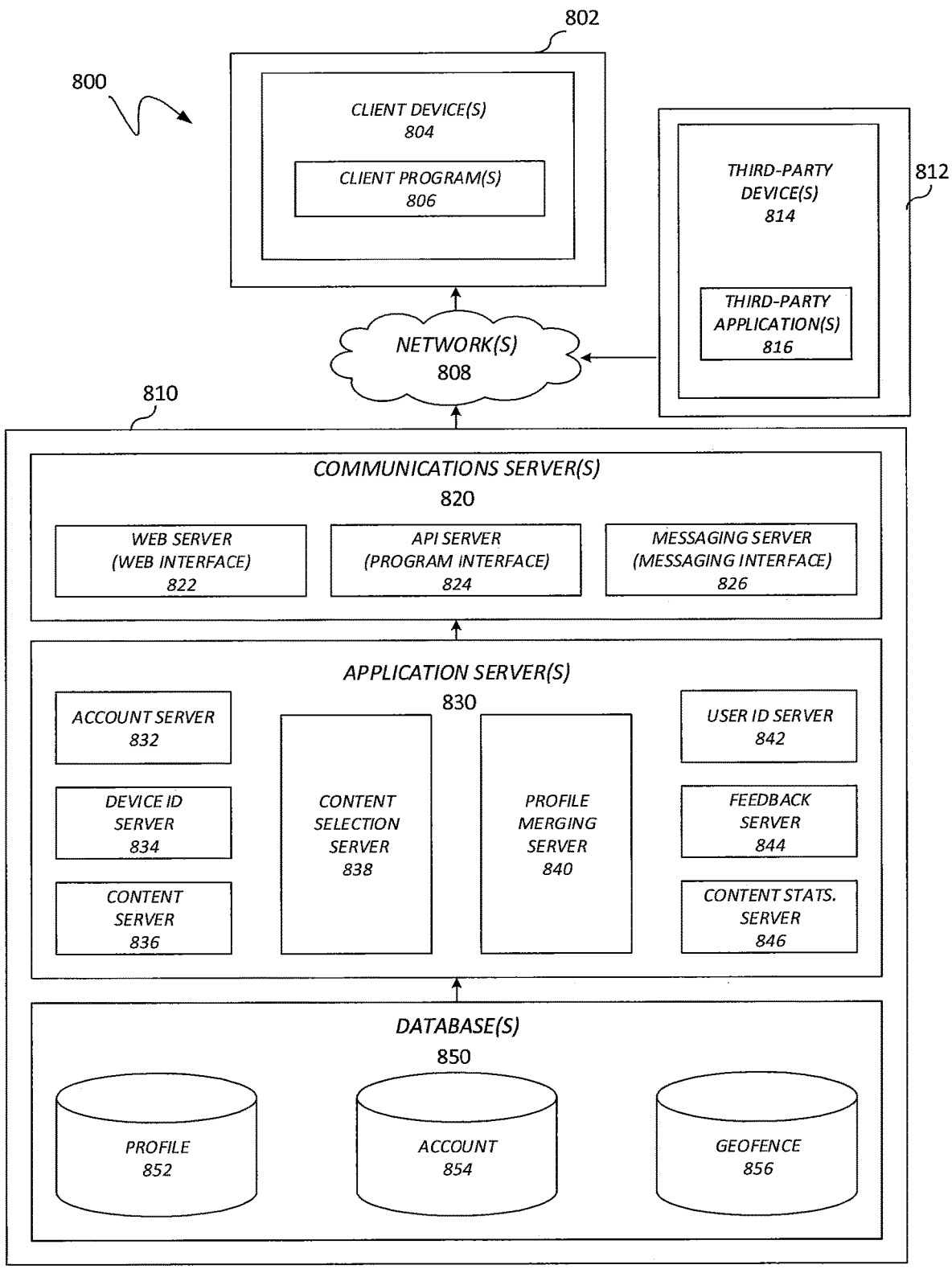
FIG. 8 illustrates a block diagram of a system for generating emoji mashups with machine learning.

FIG. 7 illustrates an example process for generating animated emoji mashups that may be implemented in a system, such as system 800 and device 102 in FIGS. 8 and 1 respectively. In particular, FIG. 7 illustrates a flow diagram illustrating operations for receiving a user input and in response presenting the user with animated emoji mashup suggestions to represent the emotion or idea conveyed in the user input. According to some embodiments, process 700 may include one or more of operations 702-718, which may be implemented, at least in part, in the form of executable code stored on a non-transitory, tangible, machine readable media that, when run on one or more hardware processors, may cause a system to perform one or more of the operations 702-718.

Process 700 may begin with operation 702, where user input is received. The user input may be in the form of a sequence, statement, sentence, phrase or other text. The user input may be input into an application used for transacting, communicating, or interacting with another user. For example, the user input may be at an application like Venmo where a user may send or request a payment to another user with a brief statement and/or emoji regarding the transaction involved. In some instances, the user input may include a text, gif, video, sticker, or other digital data.

The user input received is then analyzed for identifying a relevant emoji(s), images, frames from the video, or other data that may be scrapped from social media to present. To analyze the data, at operation 704, the input may be processed. As an example, if text is input, then word vectorization may occur using a model such as but not limited to word2vec, where word2vec may be an algorithm that may comprise at least two models that are trained to predict relationships. Alternatively, the image received may be pre-processed which can include determining which images are relevant (if a video which frame) and adequately labeling to correspond to content during a communication. In addition to labeling the images, the images are also resized to fit the device in use and user interface.

At operation 706, a determination is made as to whether a positioning model is available. If the system is still underdeveloped or if a new sequence is identified, the image processing may continue further using an object detection model at operation 708. Object detection model may be a model used to detect the emoji sequences and/or image detection to extract from the input. In other words, a determination is made as to whether the image or text had been pre-processed and details regarding coordinates, resizing, labeling, etc. already exist, else process using the object detection model. Alternatively, at operation 710 if the input received is recognized and/or sufficient user feedback exists such that image training is not needed, then emoji and image may be processed through a emoji positing model at operation 710 so that coordinate information may be extracted at operation 712. Once the coordinate information is known at operation 712, then the two or more emojis and/or images identified may be coherently combined to generate an animated emoji mashup representative of the input received. The animated emoji mashup(s) may be coherently combined at operation 714, where the output animated mashup emoji(s) may be presented to the user for selection.

Note that more or fewer operations may exist in performing method 700. In addition, an operation may exist for determining new emoji or other media object mashup. In addition, the operations are not limited to the training models identified. Further, user selection may be stored for later use by the user and/or another user.

FIG. 8 illustrates, in block diagram format, an example embodiment of a computing environment adapted for implementing a system for generating emoji mashups. As shown, a computing environment 800 may comprise or implement a plurality of servers and/or software components that operate to perform various methodologies in accordance with the described embodiments. Severs may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 2 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing environment 800 may include, among various devices, servers, databases and other elements, one or more clients 802 that may comprise or employ one or more client devices 804, such as a laptop, a mobile computing device, a tablet, a PC, a wearable device, and/or any other computing device having computing and/or communications capabilities in accordance with the described embodiments. Client devices 804 may include a cellular telephone, smart phone, electronic wearable device (e.g., smart watch, virtual reality headset), or other similar mobile devices that a user may carry on or about his or her person and access readily.

Client devices 804 generally may provide one or more client programs 806, such as system programs and application programs to perform various computing and/or communications operations. Some example system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Some example application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 806 may display various graphical user interfaces (GUIs) to present information to and/or receive information from one or more users of client devices 804. In some embodiments, client programs 806 may include one or more applications configured to conduct some or all of the functionalities and/or processes discussed above and in conjunction FIGS. 1-7.

As shown, client devices 804 may be communicatively coupled via one or more networks 908 to a network-based system 810. Network-based system 810 may be structured, arranged, and/or configured to allow client 802 to establish one or more communications sessions between network-based system 810 and various computing devices 804 and/or client programs 806. Accordingly, a communications session between client devices 804 and network-based system 810 may involve the unidirectional and/or bidirectional exchange of information and may occur over one or more types of networks 808 depending on the mode of communication. While the embodiment of FIG. 8 illustrates a computing environment 800 deployed in a client-server operating relationship, it is to be understood that other suitable operating environments, relationships, and/or architectures may be used in accordance with the described embodiments.

Data communications between client devices 804 and the network-based system 810 may be sent and received over one or more networks 808 such as the Internet, a WAN, a WWAN, a WLAN, a mobile telephone network, a landline telephone network, personal area network, as well as other suitable networks. For example, client devices 804 may communicate with network-based system 810 over the Internet or other suitable WAN by sending and or receiving information via interaction with a web site, e-mail, IM session, and/or video messaging session. Any of a wide variety of suitable communication types between client devices 804 and system 810 may take place, as will be readily appreciated. In particular, wireless communications of any suitable form may take place between client device 804 and system 810, such as that which often occurs in the case of mobile phones or other personal and/or mobile devices.

In various embodiments, computing environment 800 may include, among other elements, a third party 812, which may comprise or employ third-party devices 814 hosting third-party applications 816. In various implementations, third-party devices 814 and/or third-party applications 816 may host applications associated with or employed by a third party 812. For example, third-party devices 814 and/or third-party applications 816 may enable network-based system 810 to provide client 802 and/or system 810 with additional services and/or information, such as merchant information, data communications, payment services, security functions, customer support, and/or other services, some of which will be discussed in greater detail below. Third-party devices 814 and/or third-party applications 816 may also provide system 810 and/or client 802 with other information and/or services, such as email services and/or information, property transfer and/or handling, purchase services and/or information, and/or other online services and/or information.

In one embodiment, third-party devices 814 may include one or more servers, such as a transaction server that manages and archives transactions. In some embodiments, the third-party devices may include a purchase database that can provide information regarding purchases of different items and/or products. In yet another embodiment, third-party severs 814 may include one or more servers for aggregating consumer data, purchase data, and other statistics.

Network-based system 810 may comprise one or more communications servers 820 to provide suitable interfaces that enable communication using various modes of communication and/or via one or more networks 808. Communications servers 820 may include a web server 822, an API server 824, and/or a messaging server 826 to provide interfaces to one or more application servers 830. Application servers 830 of network-based system 810 may be structured, arranged, and/or configured to provide various online services, merchant identification services, merchant information services, purchasing services, monetary transfers, checkout processing, data gathering, data analysis, and other services to users that access network-based system 810. In various embodiments, client devices 804 and/or third-party devices 814 may communicate with application servers 830 of network-based system 810 via one or more of a web interface provided by web server 822, a programmatic interface provided by API server 824, and/or a messaging interface provided by messaging server 826. It may be appreciated that web server 822, API server 824, and messaging server 826 may be structured, arranged, and/or configured to communicate with various types of client devices 804, third-party devices 914, third-party applications 816, and/or client programs 806 and may interoperate with each other in some implementations.

Web server 822 may be arranged to communicate with web clients and/or applications such as a web browser, web browser toolbar, desktop widget, mobile widget, web-based application, web-based interpreter, virtual machine, mobile applications, and so forth. API server 824 may be arranged to communicate with various client programs 806 and/or a third-party application 816 comprising an implementation of API for network-based system 810. Messaging server 826 may be arranged to communicate with various messaging clients and/or applications such as e-mail, IM, SMS, MMS, telephone, VoIP, video messaging, IRC, and so forth, and messaging server 826 may provide a messaging interface to enable access by client 802 and/or third party 812 to the various services and functions provided by application servers 830.

Application servers 830 of network-based system 810 may be a server that provides various services to clients including, but not limited to, data analysis, geofence management, order processing, checkout processing, and/or the like. Application server 830 of network-based system 810 may provide services to a third party merchants such as real time consumer metric visualizations, real time purchase information, and/or the like. Application servers 830 may include an account server 832, device identification server 834, payment server 836, content selection server 838, profile merging server 840, user ID server 842, feedback server 854, and/or content statistics server 846. Note that any one or more of the serves 832-846 may be used in storing and/or retrieving emojis, user feedback, coordinates, emoji positioning, etc. For example, user selections may be stored in feedback server 844. These servers, which may be in addition to other servers, may be structured and arranged to configure the system for monitoring queues and identifying ways for reducing queue times.

Application servers 830, in turn, may be coupled to and capable of accessing one or more databases 850 including a profile database 852, an account database 854, geofence database 856, and/or the like. Databases 850 generally may store and maintain various types of information for use by application servers 830 and may comprise or be implemented by various types of computer storage devices (e.g., servers, memory) and/or database structures (e.g., relational, object-oriented, hierarchical, dimensional, network) in accordance with the described embodiments.

Figure 9:
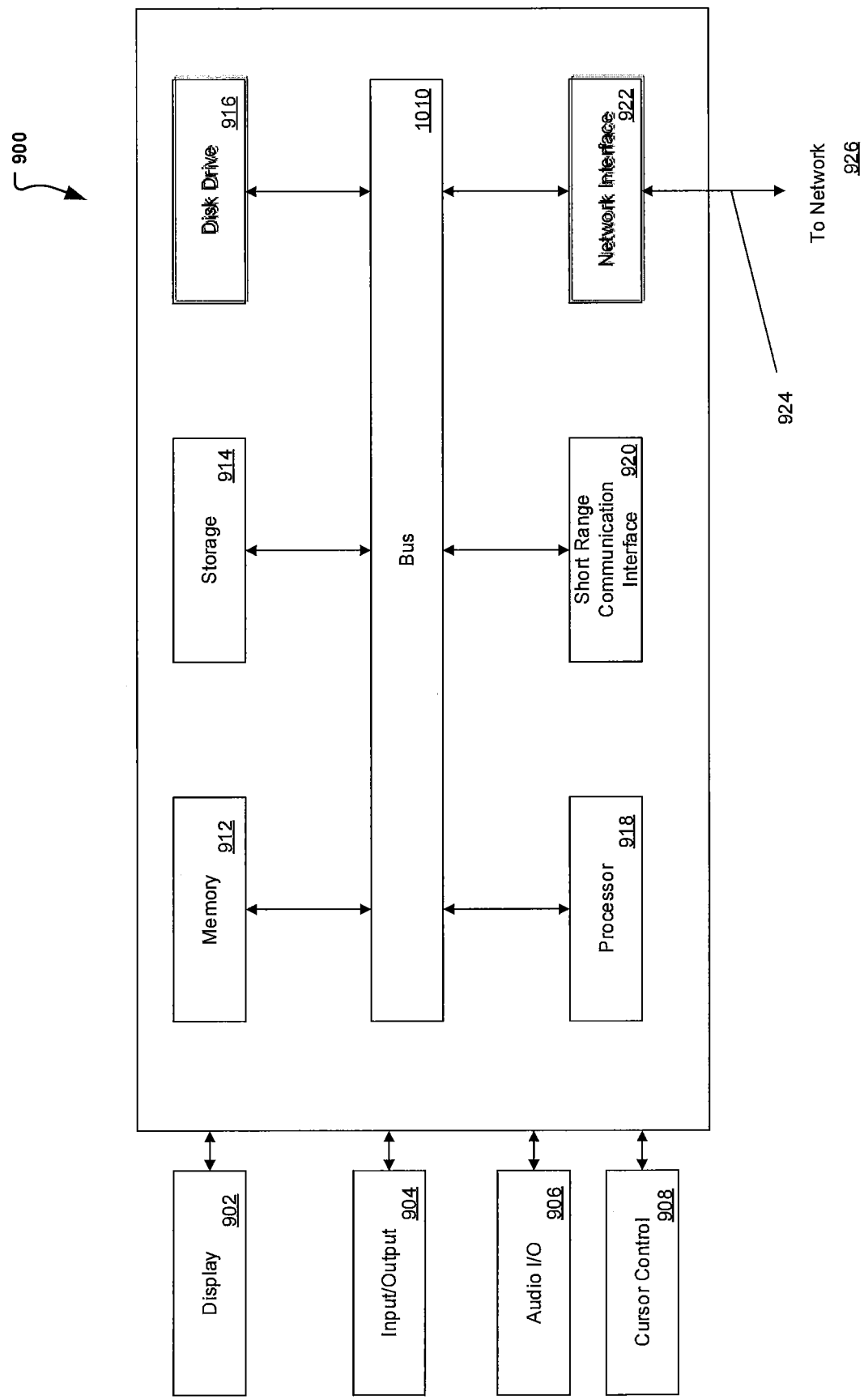
FIG. 9 illustrates an example block diagram of a computer system suitable for implementing one or more devices of the communication systems of FIGS. 1-8.

FIG. 9 illustrates an example computer system 900 in block diagram format suitable for implementing on one or more devices of the system in FIGS. 1-8. In various implementations, a device that includes computer system 900 may comprise a personal computing device (e.g., a smart or mobile device, a computing tablet, a personal computer, laptop, wearable device, PDA, user device 102, etc.) that is capable of communicating with a network 926 (e.g., networks 208,210). A service provider and/or a content provider may utilize a network computing device (e.g., a network server) capable of communicating with the network. It should be appreciated that each of the devices utilized by users, service providers, and content providers may be implemented as computer system 900 in a manner as follows.

Additionally, as more and more devices become communication capable, such as new smart devices using wireless communication to report, track, message, relay information and so forth, these devices may be part of computer system 900. For example, windows, walls, and other objects may double as touch screen devices for users to interact with. Such devices may be incorporated with the systems discussed herein.

Computer system 900 may include a bus 910 or other communication mechanisms for communicating information data, signals, and information between various components of computer system 900. Components include an input/output (I/O) component 904 that processes a user action, such as selecting keys from a keypad/keyboard, selecting one or more buttons, links, actuatable elements, etc., and sending a corresponding signal to bus 910. I/O component 904 may also include an output component, such as a display 902 and a cursor control 908 (such as a keyboard, keypad, mouse, touchscreen, etc.). In some examples, I/O component 904 other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 918, which may be a micro-controller, digital signal processor (DSP), or other processing component, that processes these various signals, such as for display on computer system 900 or transmission to other devices over a network 926 via a communication link 924. Again, communication link 924 may be a wireless communication in some embodiments. Processor 918 may also control transmission of information, such as cookies, IP addresses, images, and/or the like to other devices.

Components of computer system 900 also include a system memory component 912 (e.g., RAM), a static storage component 914 (e.g., ROM), and/or a disk drive 916. Computer system 900 performs specific operations by processor 918 and other components by executing one or more sequences of instructions contained in system memory component 912 (e.g., text processing and emoji processing). Logic may be encoded in a computer readable medium, which may refer to any medium that participates in providing instructions to processor 918 for execution. Such a medium may take many forms, including but not limited to, non-volatile media, volatile media, and/or transmission media. In various implementations, non-volatile media includes optical or magnetic disks, volatile media includes dynamic memory such as system memory component 912, and transmission media includes coaxial cables, copper wire, and fiber optics, including wires that comprise bus 910. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 900 may also include a short range communications interface 920. Short range communications interface 920, in various embodiments, may include transceiver circuitry, an antenna, and/or waveguide. Short range communications interface 920 may use one or more short-range wireless communication technologies, protocols, and/or standards (e.g., WiFi, Bluetooth®, Bluetooth Low Energy (BLE), infrared, NFC, etc.).

Short range communications interface 920, in various embodiments, may be configured to detect other devices (e.g., device 102, secondary user device, etc.) with short range communications technology near computer system 900. Short range communications interface 920 may create a communication area for detecting other devices with short range communication capabilities. When other devices with short range communications capabilities are placed in the communication area of short range communications interface 920, short range communications interface 920 may detect the other devices and exchange data with the other devices. Short range communications interface 920 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 920 may identify a local area network using a short range communications protocol, such as WiFi, and join the local area network. In some examples, computer system 900 may discover and/or communicate with other devices that are a part of the local area network using short range communications interface 920. In some embodiments, short range communications interface 920 may further exchange data and information with the other devices that are communicatively coupled with short range communications interface 920.

In various embodiments of the present disclosure, execution of instruction sequences to practice the present disclosure may be performed by computer system 900. In various other embodiments of the present disclosure, a plurality of computer systems 900 coupled by communication link 924 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 924 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a non-transitory memory; and
    one or more hardware processors coupled to the non-transitory memory and configured to read instructions from the non-transitory memory to cause the system to perform operations comprising:
        receiving, over a network connection from a first user device, user text input data entered into a text message conversation between the first user device and a second user device;
        based on a context of the user text input data, determining an image and an emoji to be merged to create a first emoji mashup;
        extracting (i) coordinate information from the determined image and (ii) coordinate information from the determined emoji;
        merging the determined image and the determined emoji to create the first emoji mashup based at least in part on a first coordinate mapping comprising spatial relationships between the coordinate information for the determined emoji and the coordinate information for the determined image; and
        transmitting, over the network connection to the first user device, the first emoji mashup that causes the first emoji mashup to be displayed on the first user device as a suggested reply in the text message conversation.

2. The system of claim 1, wherein the operations further comprise resizing the determined image.

3. The system of claim 1, wherein the operations further comprise:
    receiving a request from the first user device to create a second emoji mashup;
    merging the determined image and the determined emoji to create the second emoji mashup based at least in part on a second coordinate mapping comprising spatial relationships between the coordinate information for the determined emoji and the coordinate information for the determined image, wherein the second coordinate mapping is different than the first coordinate mapping; and transmitting, over the network connection to the first user device, the second emoji mashup for display on the first user device as another suggested reply in the text message conversation.

4. The system of claim 3, wherein the operations further comprise:
receiving, over the network connection, user feedback data related to the first emoji mashup and the second emoji mashup; and
training a coordinate mapping model using the user feedback data, wherein the second emoji mashup having a second coordinate mapping different than the first coordinate mapping is used in training the coordinate mapping model.

5. The system of claim 1, wherein the merging comprises:
spatially placing the determined image on the determined emoji based in part on the coordinate information for the determined emoji and the coordinate information for the determined image.

6. The system of claim 1, wherein the merging comprises:
spatially overlaying the determined emoji on the determined image based in part on the coordinate information for the determined emoji and the coordinate information for the determined image.

7. The system of claim 1, wherein the first coordinate mapping includes a relation between a center coordinate of the determined image and a center coordinate of the determined emoji.

8. A method comprising:
receiving, over a network connection from a first user device, user text input data entered into a text message conversation between the first user device and a second user device;
based on a context of the user text input data, determining an image and an emoji to be merged to create a first emoji mashup and a second emoji mashup;
determining coordinate information for the determined emoji;
determining coordinate information for the determined image;
generating a first emoji mashup based at least in part on the coordinate information for the determined emoji and the coordinate information for the determined image, wherein the first emoji mashup has a first coordinate mapping of the coordinate information for the determined emoji in relation to the coordinate information for the determined image;
generating a second emoji mashup based at least in part on the coordinate information for the determined emoji and the coordinate information for the determined image, wherein the second emoji mashup has a second coordinate mapping of the coordinate information for the determined emoji in relation to the coordinate information for the determined image, and wherein the second coordinate mapping is different than the first coordinate mapping; and
transmitting, over the network connection to the first user device, the first emoji mashup and the second emoji mashup that causes the first emoji mashup and the second emoji mashup to be displayed on the first user device as suggested replies in the text message conversation.

9. The method of claim 8, further comprising labeling and resizing the determined image.

10. The method of claim 8, further comprising:
receiving user feedback from the first user device indicating a preferred emoji mashup from a set comprising the first emoji mashup and the second emoji mashup; and
training an emoji mashup creation model based on the user feedback.

11. The method of claim 8, wherein the generating comprises:
spatially placing the determined image on the emoji based in part on the coordinate information for the determined emoji and the coordinate information for the determined image.

12. The method of claim 8, wherein the generating comprises:
spatially placing the determined emoji on the determined image based in part on the coordinate information for the determined emoji and the coordinate information for the determined image.

13. The method of claim 8, further comprising receiving, over the network connection from the first user device a refresh request to generate the second emoji mashup, wherein the generating the second emoji mashup is in response to receiving the refresh request.

14. A non-transitory machine-readable medium having stored thereon machine-readable instructions executable to cause a machine to perform operations comprising:
receiving, over a network connection from a first user device, user text input data entered into a text message conversation between the first user device and a second user device;
based on a context of the user text input data, determining an image and an emoji to be merged to create a first emoji mashup;
extracting (i) coordinate information from the determined image and (ii) coordinate information from the determined emoji;
generating a first emoji mashup based at least in part on the coordinate information for the determined emoji and the coordinate information for the determined image, wherein the first emoji mashup has a first coordinate mapping of the coordinate information from the determined image in relation to the coordinate information from the determined emoji; and
transmitting, over the network connection to the first user device, the first emoji mashup that causes the first emoji mashup to be displayed on the first user device as a suggested reply in the text message conversation.

15. The non-transitory machine-readable medium of claim 14, wherein the operations further comprise:
receiving, over the network connection, a request from the first user device to refresh the first emoji mashup;
in response to receiving the request to refresh, generating a second emoji mashup based at least in part on the coordinate information from the determined emoji and the coordinate information for the determined image, wherein the second emoji mashup has a second coordinate mapping of the coordinate information from the determined image in relation to the coordinate information from the determined emoji, and wherein the second coordinate mapping is different than the first coordinate mapping; and
resizing the image.

16. The non-transitory machine-readable medium of claim 15, wherein the operations further comprise:
transmitting, over the network connection to the first user device, the second emoji mashup to the first user device that causes the second emoji mashup to be displayed on the first user device as another suggested reply in the text message conversation.

17. The non-transitory machine-readable medium of claim 15, wherein the operations further comprise:
receiving, over the network connection, user feedback data related to the first emoji mashup and the second emoji mashup; and
based on the user feedback data, associating either the first emoji mashup or the second emoji mashup with the user text input data.

18. The non-transitory machine-readable medium of claim 14, wherein the operations further comprise:
spatially placing the determined image on the determined emoji based in part on the coordinate information for the determined emoji and the coordinate information for the determined image.

19. The non-transitory machine-readable medium of claim 14, wherein the operations further comprise:
spatially overlaying the determined emoji on the determined image based in part on the coordinate information for the determined emoji and the coordinate information for the determined image.

20. The non-transitory machine-readable medium of claim 14, wherein the operations further comprise:
receiving, over the network connection from the first user device, user feedback data related to the first emoji mashup; and
based on the user feedback data, training an emoji mashup model.

* * * * *